US007513109B2

(12) United States Patent
Toji et al.

(10) Patent No.: US 7,513,109 B2
(45) Date of Patent: Apr. 7, 2009

(54) HYDRAULIC CONTROLLER FOR WORKING MACHINE

(75) Inventors: Yutaka Toji, Hiroshima (JP); Yoichiro Yamazaki, Hiroshima (JP); Koji Yamashita, Hiroshima (JP); Hidekazu Oka, Hiroshima (JP); Koji Ueda, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 260 days.

(21) Appl. No.: 11/463,199

(22) Filed: Aug. 8, 2006

(65) Prior Publication Data

US 2007/0062185 A1 Mar. 22, 2007

(51) Int. Cl.
*F16D 31/02* (2006.01)
*F15B 13/044* (2006.01)

(52) U.S. Cl. .............................. 60/444; 60/422; 91/459; 91/461

(58) Field of Classification Search .................. 60/421, 60/422, 429, 444; 91/459, 461
See application file for complete search history.

(56) References Cited

U.S. PATENT DOCUMENTS 5,467,688 A * 11/1995 Maruyama et al. ............ 91/441
7,168,246 B2 * 1/2007 Toji et al. ...................... 60/468

FOREIGN PATENT DOCUMENTS

| | | |
|---|---|---|
| JP | 7-246961 | 9/1995 |
| JP | 2002-5106 | 1/2002 |
| JP | 2002-250302 | 9/2002 |
| JP | 2005-24098 | 1/2005 |

* cited by examiner

*Primary Examiner*—Michael Leslie
(74) *Attorney, Agent, or Firm*—Oblon, Spivak, McClelland, Maier & Neustadt, P.C.

(57) ABSTRACT

There is provided a hydraulic controller for a working machine in which a pilot hydraulic pressure source is connected in common to a plurality of pilot-operated hydraulic devices each having a pilot pressure input unit, and a common pilot pressure input switching valve is adapted to control the switching between a pilot pressure input from the pilot hydraulic pressure source to each pilot pressure input unit and a relief of the input. The switching control of a pilot pressure input by the pilot pressure input switching valve is performed based on the operating state of the working machine and pilot pressure input conditions of the respective pilot-operated hydraulic devices.

6 Claims, 5 Drawing Sheets

HYDRAULIC CONTROLLER FOR WORKING MACHINE

BACKGROUND OF THE INVENTION

1. Field of the Invention

The present invention relates to an apparatus for controlling the operation of a plurality of pilot-operated hydraulic devices provided in a working machine.

2. Description of the Related Art

As means for remotely controlling pilot-operated hydraulic devices provided in a working machine, there has been known an arrangement in which a pilot pressure input switching valve composed of an electromagnetic switching valve, etc. is provided between a pilot pressure input unit of the hydraulic devices and a pilot hydraulic pressure source, and the supply of the input signal of the pilot pressure to the pilot pressure input unit is switched by opening and closing the switching valve.

For example, Japanese Patent Laid-Open No. 2002-5106 discloses a hydraulic circuit in which a solenoid valve (electromagnetic switching valve) is provided between a pilot pressure input unit (swash plate) of a capacity variable hydraulic motor and a pilot hydraulic pump.

Also, Japanese Patent Laid-Open No. 2002-250302 discloses a circuit in which an electromagnetic switching valve is provided between a pilot-operated relief valve having a set pressure that increases with a pilot pressure input and a pilot hydraulic pressure source.

In the above-described hydraulic circuits, if there are a plurality of pilot-operated hydraulic devices, pilot pressure input switching valves are provided correspondingly for pilot pressure input units of the respective hydraulic devices. Therefore, the more the number of hydraulic devices, the more the number of pilot pressure input switching valves accompanying the devices, which increases the complexity and cost of the apparatus inevitably. Particularly, in the case of less frequently used hydraulic devices, the use of a pilot pressure input switching valve, if provided specially for the hydraulic devices, becomes far less frequent, being economically undesirable.

SUMMARY OF THE INVENTION

It is an object of the present invention to provide a hydraulic controller for a working machine capable of remotely controlling a plurality of pilot-operated hydraulic devices provided in the working machine with a simple and low-cost arrangement.

A hydraulic controller for a working machine according to the present invention has the following basic arrangement.

That is, the hydraulic controller for the working machine according to the present invention includes: a pilot pressure input unit; a plurality of pilot-operated hydraulic devices adapted to be operated remotely by switching between a supply of an input signal of a pilot pressure and a stop of the supply to the pilot pressure input unit and provided with mutually different pilot pressure input conditions; a pilot hydraulic pressure source connected in common to each pilot pressure input unit of the pilot-operated hydraulic devices; a pilot pressure input switching valve provided in common for the pilot-operated hydraulic devices and adapted to be switchable between a pilot pressure input position where to input a pilot pressure from the pilot hydraulic pressure source to each pilot pressure input unit of the pilot-operated hydraulic devices and a pilot pressure relief position where to relieve the pilot pressure; and switching control means for controlling a switching of the pilot pressure input switching valve based on the operating state of the working machine and the pilot pressure input conditions of the respective pilot-operated hydraulic devices.

In accordance with the present invention, since the pilot hydraulic pressure source and further the pilot pressure input switching valve are used in common for pilot pressure inputs to the plurality of pilot-operated hydraulic devices, it is possible to achieve remote control of the pilot-operated hydraulic devices while reducing the complexity and cost of the entire apparatus. In addition, it is possible to perform pilot pressure input switching control appropriately based on the operating state of the working machine and the pilot pressure input conditions set for the respective pilot-operated hydraulic devices.

It is specifically preferable that each pilot-operated hydraulic device be provided with a priority for pilot pressure input control and the switching control means be adapted to control the switching of the pilot pressure input switching valve based on the priority.

In accordance with the arrangement above, even if mutually different pilot pressure input conditions may be set for the respective pilot-operated hydraulic devices, it is possible to perform pilot pressure input switching control appropriately based on the priorities preset for the respective hydraulic devices.

More specifically, in an arrangement that if the operating state of the working machine meets the pilot pressure input condition of higher-priority pilot-operated hydraulic device among the plurality of pilot-operated hydraulic devices having mutually different priorities, the pilot pressure input switching valve is switched to the pilot pressure input position regardless of whether or not the operating state meets the pilot pressure input condition of lower-priority pilot-operated hydraulic device, while if the operating state does not meet a specific pilot pressure input condition of higher-priority pilot-operated hydraulic device, the switching of the pilot pressure input switching valve is controlled based on the pilot pressure input condition of the lower-priority pilot-operated hydraulic device, it is possible to perform switching control while prioritizing the pilot pressure input condition of the higher-priority hydraulic devices, and further in consideration of the pilot pressure input conditions of the other pilot-operated hydraulic devices if the specific condition is not met.

For example, it is preferable that the pilot-operated hydraulic devices include a traveling motor having a capacity variable depending on the supply of the input signal of the pilot pressure, the traveling motor being provided with a priority higher than those of the other pilot-operated hydraulic devices, and that if the working machine is in a non-traveling state, the switching of the pilot pressure input switching valve be controlled based on the pilot pressure input conditions of the other pilot-operated hydraulic devices. In this case, it is possible to perform switching control while prioritizing the traveling control of the working machine over pilot pressure input, and further in consideration of the pilot pressure input conditions of the other pilot-operated hydraulic devices if the working machine is in a non-traveling state.

Also, in the case of pilot-operated hydraulic devices including first pilot-operated hydraulic device having a pilot pressure input condition that a specific parameter related to the operating state of the working machine is equal to or greater than a predetermined level and second pilot-operated hydraulic device having a pilot pressure input condition that the parameter is less than the predetermined level, it is possible to perform preferred switching control as follows in consideration of the pilot pressure input conditions of the both pilot-operated hydraulic devices.

That is, in the case of employing the pilot pressure input condition of either the first pilot-operated hydraulic device or the second pilot-operated hydraulic device, the switching of the pilot pressure input switching valve is controlled based on the pilot pressure input condition of the first pilot-operated hydraulic device if the parameter is equal to or greater than the predetermined level, while based on the pilot pressure input condition of the second pilot-operated hydraulic device if the parameter is less than the predetermined level.

For example, if the first pilot-operated hydraulic device is a pilot-operated relief valve adapted to be opened when the discharge pressure of a hydraulic pump exceeds a set pressure that increases with a pilot pressure input, while the second pilot-operated hydraulic device is an actuator flow rate switching valve for reducing the supply flow rate to a specific working hydraulic actuator with a pilot pressure input, it is preferable to set, for example, the discharge pressure of the hydraulic pump as the parameter.

In the case above, if the second pilot-operated hydraulic device has a pilot pressure input condition: a) a rotation driving speed of the hydraulic pump is equal to or less than a predetermined level, it is possible to reduce the occurrence of cavitation effectively when the hydraulic pump has a lower rotation driving speed. Also, if the device has a condition: b) a plurality of working hydraulic actuators including the specific working hydraulic actuator are driven simultaneously, it is possible to reduce the uneven supply flow rate to each working hydraulic actuator effectively.

DESCRIPTION OF THE PREFERRED EMBODIMENTS

Figure 6:
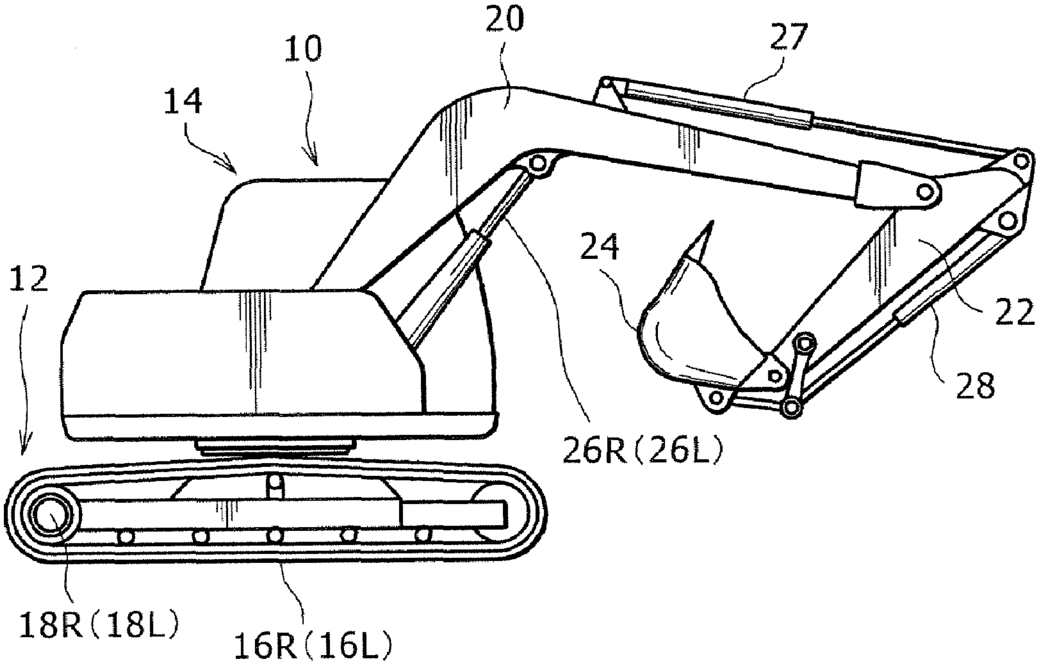
FIG. 6 is a side view showing a hydraulic excavator with the hydraulic controller installed therein.

A preferred embodiment of the present invention will be described with reference to the accompanying drawings. It is noted that although the present embodiment is obtained by applying the present invention to a hydraulic excavator 10 shown in FIG. 6, the present invention can also be applied effectively to other working machines such as hydraulic cranes and crushing machines.

The hydraulic excavator 10 includes a lower traveling body 12 and an upper rotating body 14 mounted rotatably on the lower traveling body.

The lower traveling body 12 includes left and right traveling crawlers 16L and 16R, the traveling crawlers 16L and 16R including, respectively, traveling motors 18L and 18R as hydraulic motors for rotating the iron wheels of the crawlers.

In the hydraulic excavator 10, a boom 20 is provided hoistably on the upper rotating body 14 as a working attachment. An arm 22 is connected rotatably to the leading end of the boom 20. Further, a bucket 24 is attached rotatably to the leading end of the arm 22. Here, the hoisting of the boom 20, the rotating of the arm 22 with respect to the boom 20, and the rotating of the bucket 24 with respect to the arm 22 are to be achieved by expanding and contracting, respectively, a pair of left and right boom cylinders 26L and 26R, an arm cylinder 27, and a bucket cylinder 28.

Figure 1:
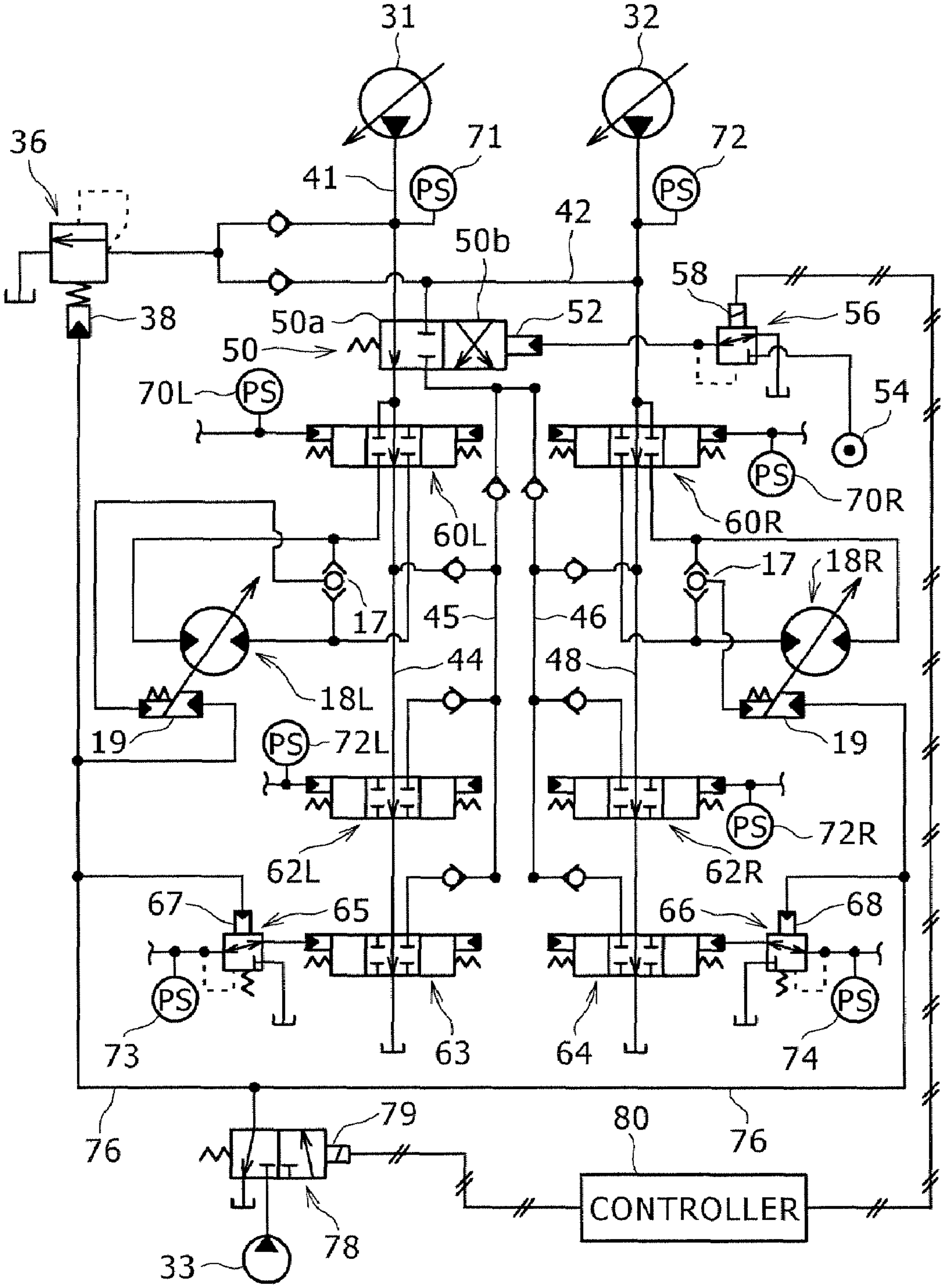
FIG. 1 is a circuit diagram showing a hydraulic controller according to an embodiment of the present invention.

FIG. 1 shows a hydraulic circuit installed in the hydraulic excavator 10. This circuit includes first and second hydraulic pumps 31 and 32 as hydraulic pressure sources and a pilot hydraulic pump 33 as a pilot hydraulic pressure source.

A variable relief valve 36 is provided in common on a discharge oil path 41 of the first hydraulic pump 31 (hereinafter referred to as "first discharge oil path 41") and on a discharge oil path 42 of the second hydraulic pump 32 (hereinafter referred to as "second discharge oil path 42").

The variable relief valve 36 is formed as a pilot-operated relief valve having a pilot chamber (pilot pressure input unit) 38. It is arranged that when the pilot chamber 38 is provided with a pilot pressure, the relief set pressure is increased compared to the case with no pilot pressure provided (that is, the maximum attachment actuating force is increased). It is specifically arranged that when there is no pilot pressure provided, the set pressure of the variable relief valve 36 is kept at a rated main relief pressure (35 MPa in the present embodiment), while when a pilot pressure is provided, the set pressure is increased to a pressure higher than the rated main relief pressure (40 MPa in the present embodiment).

The first discharge oil path 41 is connected to one input port of a hydraulic pressure supply switching valve 50 formed as a two-position pilot switching valve. One of the two output ports of the hydraulic pressure supply switching valve 50 is connected with a center bypass flow path 44, while the other is connected with attachment supply oil paths 45 and 46. On the other hand, the second discharge oil path 42 is connected to the other input port of the hydraulic pressure supply switching valve 50, and a center bypass flow path 48 branches at the middle of the discharge oil path 42.

The hydraulic pressure supply switching valve 50 is adapted to connect the first discharge oil path 41 to the center bypass flow path 44 and to be switched to a position (normal position) 50*a* where to block the second discharge oil path 42 when the pilot chamber 52 is provided with no pilot pressure, while is adapted to connect the discharge oil path 41 to the attachment supply oil paths 45 and 46 and to be switched to a position (straight-ahead traveling position) 50*b* where to connect the discharge oil path 42 to the center bypass flow path 44 when the pilot chamber 52 is provided with a pilot pressure equal to or higher than a predetermined level.

An electromagnetic proportional decompression valve 56 is provided between the pilot chamber 52 of the hydraulic pressure supply switching valve 50 and a pilot hydraulic pressure source 54. The electromagnetic proportional decompression valve 56 includes a solenoid 58 and is adapted to block off the pilot chamber 52 from the pilot hydraulic pressure source 54 when the solenoid 58 is provided with no excitation current. Meanwhile, the electromagnetic proportional decompression valve 56 is adapted to connect the pilot chamber 52 with the pilot hydraulic pressure source 54 to supply a pilot pressure equal to or higher than a predetermined level to the pilot chamber 52 when the solenoid 58 is provided with an excitation current equal to or higher than a predetermined level.

In this hydraulic circuit, as control valves for controlling the driving of each actuator, there are provided a left traveling control valve 60L, a left boom cylinder control valve 62L, and a bucket cylinder control valve 63 along the center bypass flow path 44 in this order from the upstream side, while there are provided a right traveling control valve 60R, a right boom cylinder control valve 62R, and an arm cylinder control valve 64 along the center bypass flow path 48 in this order from the upstream side. These control valves are each formed as a three-position pilot switching valve having pilot chambers on either side.

Among the control valves, the left traveling control valve 60L is adapted to open the center bypass flow path 44, at the neutral position (as shown in the figure), to cause the whole amount of hydraulic oil to flow through the flow path 44, while is adapted to guide hydraulic oil flowing thereinto from the center bypass flow path 44 to the left traveling motor 18L, when operated in one direction from the neutral position through a lever operation of a traveling remote control valve not shown in the figure, by the flow rate corresponding to the operation amount in the supply/discharge direction corresponding to the operation direction. Similarly, the right traveling control valve 60R is adapted to open the center bypass flow path 48, at the neutral position (middle position in the figure), to cause the whole amount of hydraulic oil to flow through the flow path 48, while is adapted to guide hydraulic oil flowing thereinto from the center bypass flow path 48 to the right traveling motor 18R, when operated in one direction from the neutral position through a lever operation of a traveling remote control valve not shown in the figure, by the flow rate corresponding to the operation amount in the supply/discharge direction corresponding to the operation direction.

In the present embodiment, the traveling motors 18L and 18R are each formed as a capacity variable hydraulic motor. The capacity operation mechanism thereof is a pilot-operated one in which the motor capacity is switched in accordance with the balance between the primary pressure of the traveling motors 18L and 18R to be taken in through shuttle valves 17 and a pilot pressure to be input to each pilot chamber (pilot pressure input unit) 19.

Specifically, the capacity of the traveling motors 18L and 18R is kept at a level for first-speed (lower-speed) traveling if the primary pressure, that is, the pressure corresponding to the traveling load is lower than a preset automatic first-speed switching pressure (28 MPa in the present embodiment) and when each pilot chamber 19 is provided with no pilot pressure, while is switched to a level for second-speed (higher-speed) traveling when each pilot chamber 19 is provided with a pilot pressure. On the contrary, if the primary pressure is equal to or higher than the automatic first-speed switching pressure, the capacity is kept at a level for first-speed traveling regardless of a pilot pressure to be input to each pilot chamber 19.

In addition, the boom cylinder control valves 62L and 62R, bucket cylinder control valve 63, and arm cylinder control valve 64 are each adapted to open the center bypass flow path 44 (or 48), at the neutral position (as shown in the figure), to cause the whole amount of hydraulic oil to flow through the flow path, while are adapted to perform the following operation when operated in one direction from the neutral position through a lever operation of a remote control valve not shown in the figure. That is, hydraulic oil supplied from the attachment supply oil path 45 (or 46) is to be guided to the corresponding working actuator (boom cylinders 26L and 26R for the boom cylinder control valves 62L and 62R, bucket cylinder 28 for the bucket cylinder control valve 63, and arm cylinder 27 for the arm cylinder control valve 64) by the flow rate corresponding to the operation amount in the supply/discharge direction corresponding to the operation direction.

It is noted that the attachment supply oil paths 45 and 46 are connected to the respective center bypass flow paths 44 and 48 via check valves on the direct downstream side of the traveling control valves 60L and 60R. This allows hydraulic oil flowing from the traveling control valves 60L and 60R to the center bypass flow paths 44 and 48 to flow into the attachment supply oil paths 45 and 46.

Further, a bucket cylinder flow rate switching valve 65 is provided between each pilot chamber of the bucket cylinder control valve 63 and the pilot hydraulic pressure source therefor. Similarly, an arm cylinder flow rate switching valve 66 is provided between each pilot chamber of the arm cylinder control valve 64 and the pilot hydraulic pressure source therefor (for the sake of convenience, the figure is for pilot chambers only on one side). These flow rate switching valves 65 and 66 are each formed as a pilot-operated decompression valve. It is arranged that when the pilot chambers 67 and 68 are provided with pilot pressures, pilot pressures to be input to the respective control valves 63 and 64 are reduced compared to the case with no pilot pressure provided, which reduces the supply flow rate to the cylinders 28 and 27.

It is noted that the flow rate switching valves are not restricted to those for reducing the pilot pressures of the control valves 63 and 64 as shown in the figure, and may be, for example, variable flow rate control valves to be provided in a position where meter-in or meter-out control is allowed.

The apparatus shown in the figure is characterized in that the pilot chambers 19 of the traveling motors 18L and 18R, the pilot chamber 38 of the variable relief valve 36, and the pilot chambers 67 and 68 of the flow rate switching valves 65 and 66 can all be connected to the pilot hydraulic pump 33 via a pilot line 76 and a common pilot pressure input switching valve 78. The pilot pressure input switching valve 78 is formed as an electromagnetic switching valve having a solenoid 79, and is adapted to keep a pilot pressure relief position where to cause the pilot line 76 to communicate with a tank to relieve the pilot pressure when the solenoid 79 is provided with no excitation current, while is adapted to be switched to a pilot pressure input position where to connect the pilot line 76 with the pilot hydraulic pump 33 to input pilot pressures from the pilot line 76 to all the pilot chambers 19, 38, 67, and 68 when the solenoid 79 is provided with an excitation current.

In the hydraulic circuit shown in FIG. 1, a left traveling pressure switch 70L, a right traveling pressure switch 70R, a first hydraulic pump pressure switch 71, a second hydraulic pump pressure switch 72, boom pressure switches 72L and 72R, a bucket pressure switch 73, and an arm pressure switch 74 are provided as pressure switches.

The traveling pressure switches 70L and 70R are connected to the respective pilot lines of the left and right traveling control valves 60L and 60R, and are adapted to be switched from OFF to ON when the pilot pressure becomes a predetermined level or more (that is, the traveling lever is operated). Similarly, the boom pressure switches 72L and 72R, bucket pressure switch 73, and arm pressure switch 74 are connected to the respective pilot lines of the boom cylinder control valves 62L and 62R, bucket cylinder control valve 63, and arm cylinder control valve 64. Thus, the pressure switches are adapted to be switched from OFF to ON when the pilot pressure of each pilot line becomes a predetermined level or more (that is, the operating lever of the corresponding attachment is operated).

Also, the first and second hydraulic pump pressure switches 71 and 72 are connected, respectively, to the first and second discharge oil paths 41 and 42, and are adapted to be switched from OFF to ON when the pressure of the discharge oil paths 41 and 42, that is, the discharge pressure of the hydraulic pumps 31 and 32 becomes a predetermined threshold value or more. The threshold value is set as a pressure higher than the automatic first-speed switching pressure (28 MPa in the present embodiment) in the traveling motors 18L and 18R, but lower than the rated main relief pressure (35 MPa in the present embodiment), being set to 30 MPa in the present embodiment.

It is noted that a pressure sensor may be used appropriately in place of each pressure switch 70L, 70R, 71, 72, 72L, 72R, 73, 74.

Figure 2:
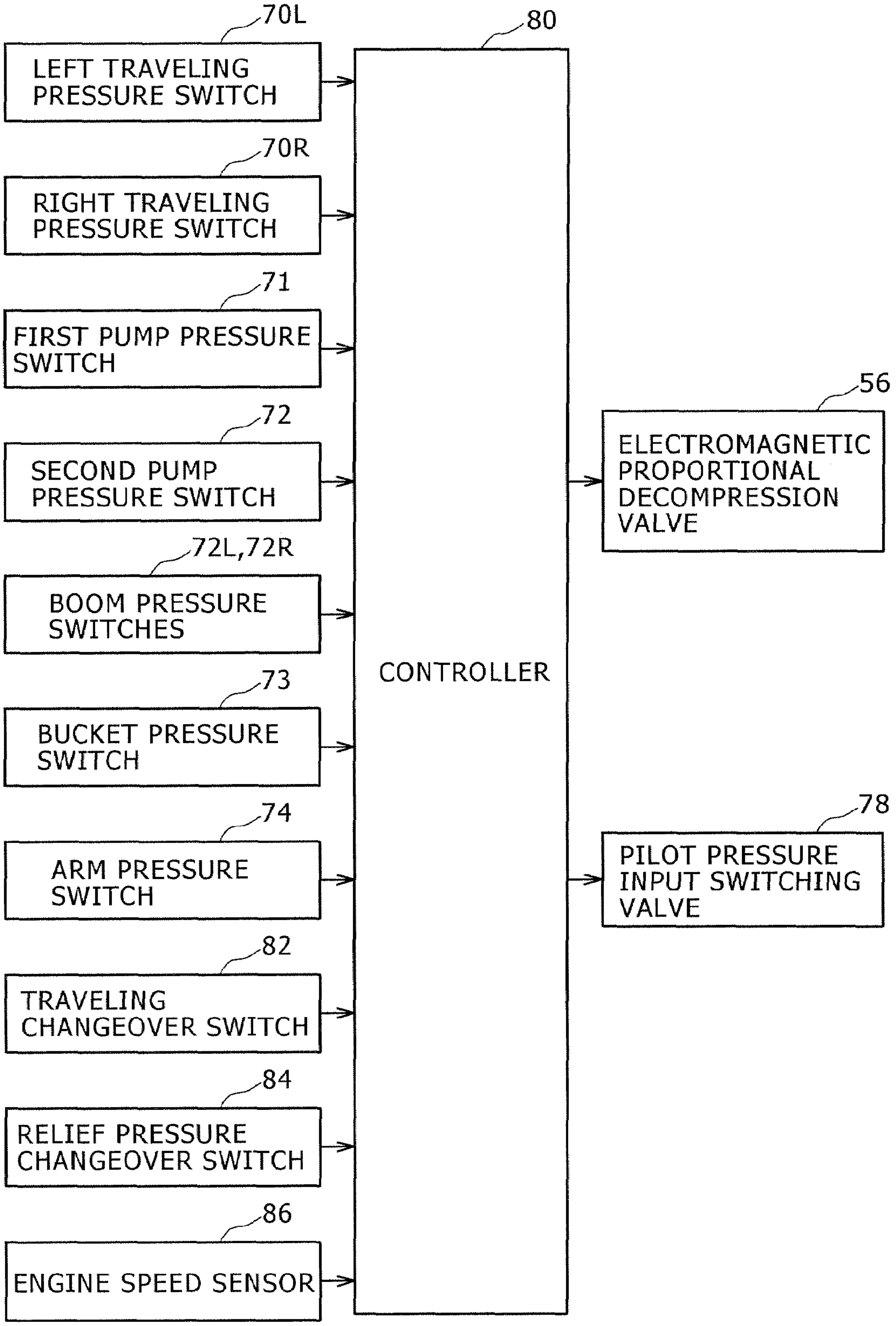
FIG. 2 is a block diagram showing input and output signals of a controller provided in the hydraulic controller shown in FIG. 1.

A detection signal of each pressure switch 70L, 70R, 71, 72, 72L, 72R, 73, 74 is to be input to a controller 80 as shown also in FIG. 2. The controller 80 is composed of a microcomputer, etc. and is adapted to take not only each detection signal but also, for example, a selection signal of a traveling changeover switch 82 for an operator selecting a speed (first or second speed) of the traveling motors 18, a selection signal of a relief pressure changeover switch 84 for selecting a main relief pressure (lower or higher pressure), and a detection signal of an engine speed sensor 86 to control the switching of the electromagnetic proportional decompression valve 56 and the pilot pressure input switching valve 78 based on these signals. Detailed control actions are as follows.

A) Switching Control for the Electromagnetic Proportional Decompression Valve 56

This switching control is based on a determination whether there is an isolated operation of either a traveling operation or an operation for a working attachment (boom 20, arm 22, or bucket 24) or there is a combined operation of performing the both operations simultaneously.

Specifically, when any traveling operation is performed but no working attachment is operated, that is, when the boom pressure switches 72L and 72R, bucket pressure switch 73, and arm pressure switch 74 are all in OFF state, the controller 80 is adapted to perform the following control action. That is, the controller 80 is adapted to stop the excitation of the solenoid 58 in the electromagnetic proportional decompression valve 56 to block off the pilot chamber 52 of the hydraulic pressure supply switching valve 50 from the pilot hydraulic pressure source 54 and thereby to switch the switching valve 50 to the normal position 50*a*. This causes the first discharge oil path 41 to be connected only to the center bypass flow path 44 of the center bypass flow paths 44 and 48, while the second discharge oil path 42 to be connected only to the center bypass flow path 48, and the attachment supply oil path 46 is blocked off from the both discharge oil paths 41 and 42. Therefore, the left traveling motor 18L is to be driven mainly by discharge oil of the first hydraulic pump 31, while the right traveling motor 18R is to be driven mainly by discharge oil of the second hydraulic pump 32.

Also, when no traveling operation is performed but any attachment is operated, that is, when at least one of the boom pressure switches 72L and 72R, bucket pressure switch 73, and arm pressure switch 74 is turned ON, the hydraulic pressure supply switching valve 50 is kept at the normal position 50*a* to supply hydraulic oil to the attachment to be operated in this state. For example, when the boom cylinder control valve 62L is operated with no traveling operation, the boom cylinder 26L is provided with hydraulic oil from the first hydraulic pump 31 via the first discharge oil path 41, center bypass flow path 44, and attachment supply oil path 45 in this order.

On the other hand, when there is a combined operation of operating any working attachment simultaneously with a traveling operation, the controller 80 is adapted to perform the following control action. That is, the controller 80 is adapted to provide an excitation current to the solenoid 58 to cause the pilot chamber 52 of the hydraulic pressure supply switching valve 50 to be provided with a pilot pressure from the pilot hydraulic pressure source 54 and thereby to switch the switching valve 50 to the straight-ahead traveling position 50*b*. This causes the first discharge oil path 41 to be connected only to the attachment supply oil paths 45 and 46 among the flow paths 44, 45, 46, and 48, while the second discharge oil path 42 to be connected to the center bypass flow path 44 to have connections with the both center bypass flow paths 44 and 48. Thus, discharge oil of the first hydraulic pump 31 cannot be supplied toward the traveling motors 18L and 18R but only toward the attachments, whereby the traveling motors 18L and 18R are to be driven only by discharge oil of the second hydraulic pump 32 to ensure straight-ahead traveling.

B) Switching Control for the Pilot Pressure Input Switching Valve 78

This switching control is based on pilot pressure input conditions set, respectively, for the traveling motors 18L and 18R, variable relief valve 36, and flow rate switching valves 65 and 66 as hydraulic device to be provided with pilot pressures and a priority set for each hydraulic device.

Specifically, the switching control of a pilot pressure input to the traveling motors 18L and 18R is prioritized over the controls for the other devices (variable relief valve 36 and flow rate switching valves 65 and 66), and the following conditions are set as the pilot pressure input conditions thereof (that is, for switching the traveling motors 18L and 18R from first to second speed).

1-1) Any traveling operation is performed.

1-2) Second speed is selected by the traveling changeover switch.

1-3) The traveling load is less than 30 MPa.

Here, the condition 1-3) is for preventing a situation where second-speed traveling is selected to cause a pilot pressure input and thereby the relief set pressure to be increased unintentionally, though the traveling load of the traveling motors 18L and 18R is 28 MPa or more and the traveling motors 18L and 18R are switched to first speed (lower speed) automatically.

It is noted that in the case of including only a single hydraulic pump to supply hydraulic oil to the traveling motors 18L and 18R therefrom, it is only required that the condition 1-3) be determined based only on the discharge pressure of the hydraulic pump.

Meanwhile, the following conditions are set as the pilot pressure input conditions of the variable relief valve 36 (that is, for increasing the main relief pressure higher than the rated main relief pressure).

2-1) The discharge pressure P1 of the first hydraulic pump 31 or the discharge pressure P2 of the second hydraulic pump 32 is 30 MPa or more.

2-2) A relief pressure increase command signal is input by the relief pressure changeover switch 84.

Also, the following conditions are set as the pilot pressure input conditions of the flow rate switching valves 65 and 66 (that is, for reducing the set pressure of the decompression valves constituting the flow rate switching valves 65 and 66 to reduce the supply flow rate from the control valves 63 and 64 to the bucket cylinder 28 and the arm cylinder 27).

3-1) The discharge pressure P1 of the first hydraulic pump 31 or the discharge pressure P2 of the second hydraulic pump 32 is less than 30 MPa.

3-2) The operating state of the hydraulic excavator 10 is under either of the following conditions.

a) The speed of the engine as a driving source of the hydraulic pumps 31 and 32 is 1500 rpm or less. This condition is set for reducing the supply flow rate of hydraulic oil to the bucket cylinder 28 or the arm cylinder 27, when the hydraulic pumps 31 and 32 are driven at a low speed, to prevent cavitation.

b) There is any combined operation in which multiple cylinders among the boom cylinders 26, arm cylinder 27, and bucket cylinder 28 are driven simultaneously. This condition is set for preventing a situation where when any combined operation is performed, a relatively large amount of hydraulic oil flows into a cylinder with a light load, resulting in a significant reduction in the supply flow rate to the other cylinders.

Figure 3:
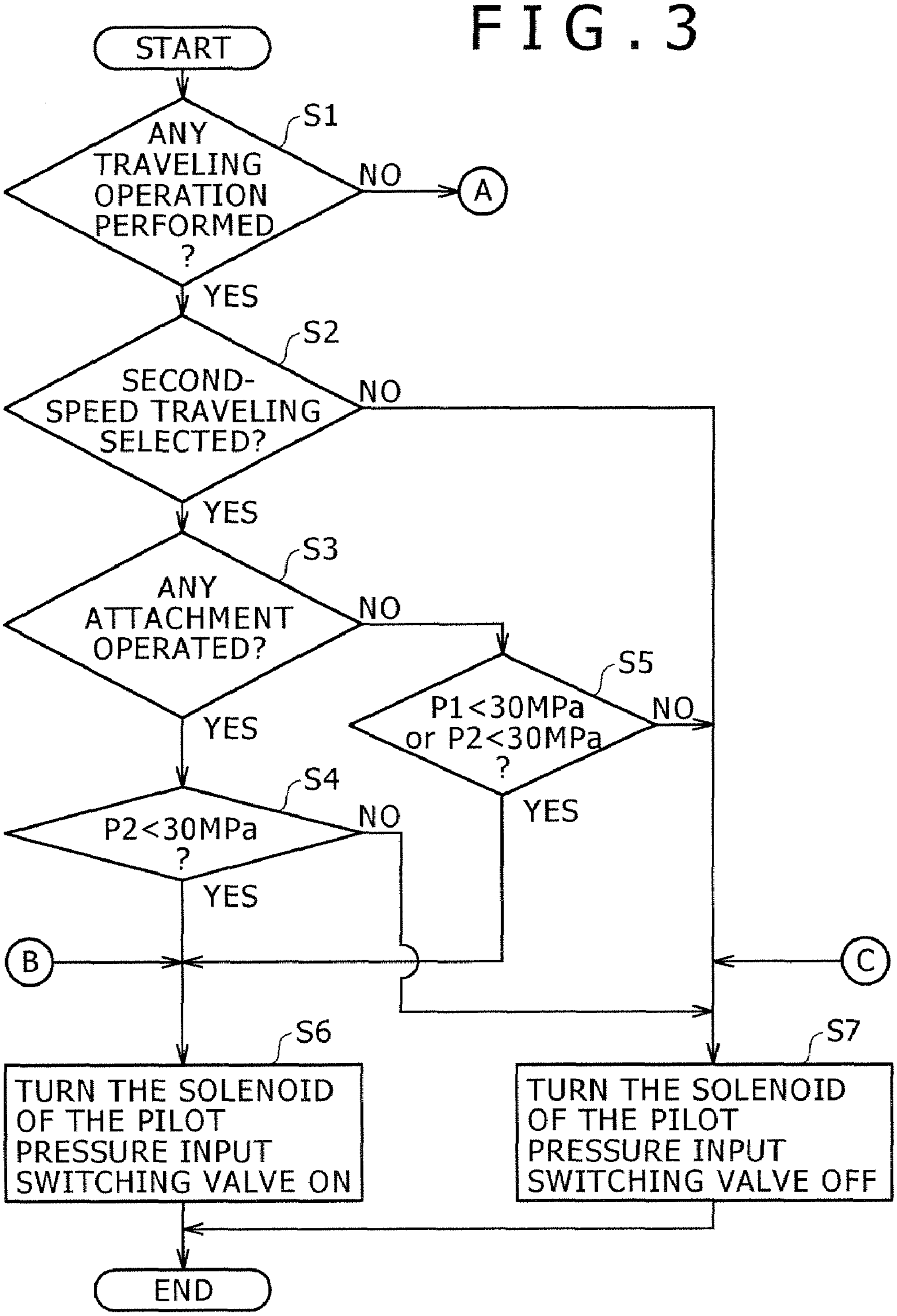
FIG. 3 is a flow chart partially showing the operation of pilot pressure input switching control to be performed by the controller in the hydraulic controller according to the present invention.

Next will be described control actions that the controller 80 performs actually for the switching of the pilot pressure input switching valve 78 with reference to the flow charts shown in FIGS. 3 and 4.

First, if the condition "any traveling operation is performed" as one of the pilot pressure input conditions of the traveling motors 18L and 18R having a higher priority is met, that is, if either of the traveling pressure switches 70L and 70R is turned ON ("YES" in step S1 in FIG. 3), the switching of the pilot pressure input switching valve 78 is controlled in consideration only of the other pilot pressure input conditions of the traveling motors 18L and 18R regardless of the pilot pressure input conditions set for the other pilot-operated hydraulic devices (variable relief valve 36 and flow rate switching valves 65 and 66).

That is, when any traveling operation is performed, only if second-speed traveling is selected by the traveling changeover switch 82 ("YES" in step S2) and the traveling load is less than 30 MPa ("YES" in step S4 or S5), the solenoid 79 of the pilot pressure input switching valve 78 is controlled to be ON (step S6). The determination of the traveling load is based on the discharge pressure of a hydraulic pump used for traveling.

Specifically, if any attachment (boom 20, arm 22, bucket 24) is operated ("YES" in step S3), the electromagnetic proportional decompression valve 56 is turned ON and thereby the hydraulic pressure supply switching valve 50 is switched to the straight-ahead traveling position 50*b*, whereby the traveling motors 18L and 18R are to be driven only by discharge oil of the second hydraulic pump 32. Therefore, it is only required to consider the discharge pressure P2 of the second hydraulic pump 32. That is, if the discharge pressure P2 is less than 30 MPa (the second pump pressure switch 72 is turned OFF) ("YES" in step S4), the solenoid 79 of the pilot pressure input switching valve 78 is turned ON (step S6) to cause the pilot chambers 19 of the traveling motors 18L and 18R to be provided with a pilot pressure so that the traveling motors 18L and 18R are switched to second speed as indicated by a selection command, while if the discharge pressure P2 is 30 MPa or more (the second pump pressure switch 72 is turned ON) ("NO" in step S4), the traveling motors 18L and 18R are switched to first speed automatically regardless of a pilot pressure input. Thus, the solenoid 79 is turned OFF (step S7) to relieve the pilot pressure input to the traveling motors 18L and 18R.

On the contrary, if no attachment is operated ("NO" in step S3), the electromagnetic proportional decompression valve 56 is turned OFF and thereby the hydraulic pressure supply switching valve 50 is kept at the normal position 50*a*, whereby the left and right traveling motors 18L and 18R are to be driven, respectively, by discharge oil of the first and second hydraulic pumps 31 and 32. Therefore, it is required to consider the discharge pressures P1 and P2 of the both hydraulic pumps 31 and 32. That is, if at least one of the discharge pressures P1 and P2 is less than 30 MPa (at least one of the pressure switches 71 and 72 is turned OFF) ("YES" in step S5), the solenoid 79 of the pilot pressure input switching valve 78 is turned ON (step S6) to switch the traveling motors 18L and 18R to second speed, while if both the discharge pressures P1 and P2 are 30 MPa or more (both the pressure switches 71 and 72 are turned ON) ("NO" in step S5), the solenoid 79 is turned OFF (step S7) to relieve the pilot pressure input to the traveling motors 18L and 18R.

Figure 4:
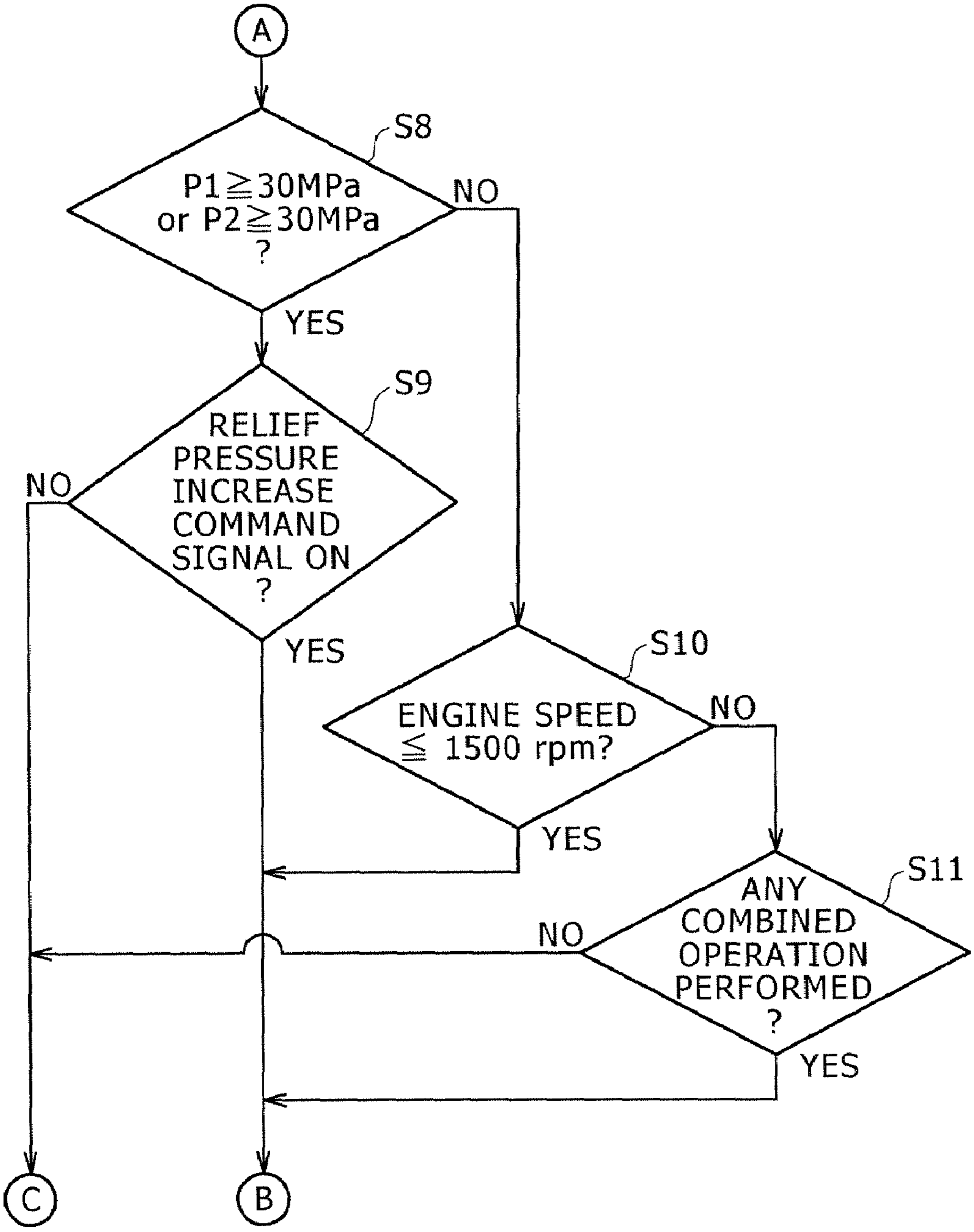
FIG. 4 is a flow chart partially showing the operation of pilot pressure input switching control to be performed by the controller in the hydraulic controller according to the present invention.

Meanwhile, if no traveling operation is performed, that is, both the traveling pressure switches 70L and 70R are turned OFF ("NO" in step S1), the switching of the pilot pressure input switching valve 78 is controlled based on the pilot pressure input conditions set for the variable relief valve 36 and the flow rate switching valves 65 and 66 as shown in FIG. 4.

In the present embodiment, the condition that at least one of the discharge pressures P1 and P2 of the hydraulic pumps 31 and 32 is 30 MPa or more (that is, at least one of the hydraulic pump pressure switches 71 and 72 is turned ON) is one of the pilot pressure input conditions of the variable relief valve 36. Conversely, since the condition that both the discharge pressures P1 and P2 are less than 30 MPa (that is, both the hydraulic pump pressure switches 71 and 72 are turned OFF) is one of the pilot pressure input conditions of the flow rate switching valves 65 and 66, if at least one of the discharge pressures P1 and P2 is 30 MPa or more ("YES" in step S8), the switching of the pilot pressure input switching valve 78 is controlled based on the pilot pressure input conditions of the variable relief valve 36. Conversely, if both the discharge pressures P1 and P2 are less than 30 MPa ("NO" in step S8), the switching of the pilot pressure input switching valve 78 is controlled based on the pilot pressure input conditions of the flow rate switching valves 65 and 66.

Specifically, if at least one of the discharge pressures P1 and P2 is 30 MPa or more ("YES" in step S8), it is determined whether or not the other pilot pressure input condition of the variable relief valve 36 is met, that is, the relief pressure increase command signal of the relief pressure changeover switch 84 is ON (step S9), and if the signal is ON, the solenoid 79 of the pilot pressure input switching valve 78 is turned ON (step S6 in FIG. 3) to cause the pilot chamber 38 of the variable relief valve 36 to be provided with a pilot pressure and thereby to increase the set pressure (main relief pressure) thereof, while if the relief pressure increase command signal is OFF, the solenoid 79 is turned OFF (step S7 in FIG. 3) to relieve the pilot pressure and thereby to keep the set pressure of the variable relief valve 36 at the rated main relief pressure.

On the contrary, if both the discharge pressures P1 and P2 are less than 30 MPa ("NO" in step S8 in FIG. 4), it is determined whether or not the other pilot pressure input condition of the flow rate switching valves 65 and 66 is met, that is, at least one of the conditions: a) the engine speed is 1500 rpm or less; and b) there is any combined operation is met. If at least one of the conditions "a" and "b" is met ("YES" in step S10 or S11), the solenoid 79 of the pilot pressure input switching valve 78 is turned ON (step S6 in FIG. 3) to cause the pilot chambers 67 and 68 of the flow rate switching valves

65 and 66 to be provided with a pilot pressure. This reduces the pilot pressure of the bucket cylinder control valve 63 and the arm cylinder control valve 64 to limit the supply flow rate to the bucket cylinder 28 and the arm cylinder 27. Accordingly, it is possible to reduce the occurrence of cavitation when the hydraulic pumps 31 and 32 are driven at a low speed, and further to reduce the uneven supply flow rate of hydraulic oil to each cylinder when any combined operation is performed. Meanwhile, if both the conditions "a" and "b" are not met ("NO" in steps S10 and S11), the solenoid 79 is turned OFF (step S7 in FIG. 3) to relieve the pilot pressure and thereby to keep the pilot pressure of the bucket cylinder control valve 63 and the arm cylinder control valve 64 at normal levels.

It is noted that either of the conditions "a" and "b" may be omitted when thus performing the switching control of a pilot pressure input to the flow rate switching valves 65 and 66. Alternatively, other conditions may be set.

In accordance with the thus described apparatus, it is possible to reduce the complexity and cost of the circuit by using the pilot hydraulic pump 33 as a pilot hydraulic pressure source and further the pilot pressure input switching valve 78 in common for pilot pressure input to the traveling motors 18L and 18R, variable relief valve 36, and flow rate switching valves 65 and 66.

Particularly, as exemplified using the relationship between the traveling motors 18L, 18R and the variable relief valve 36 as well as the flow rate switching valves 65 and 66, since each hydraulic device to be provided with a pilot pressure is provided with a priority and the pilot pressure input condition of higher-priority hydraulic devices (e.g. the traveling motors 18L and 18R in the figures) is prioritized, it is possible to perform switching control appropriately while using the pilot pressure input switching valve 78 in common for a plurality of pilot-operated hydraulic devices.

Also, as in the variable relief valve 36 as well as the flow rate switching valves 65 and 66, in the case of including one pilot pressure input condition that a specific parameter (e.g. the discharge pressures P1 and P2 of the hydraulic pumps 31 and 32 in the figures) is equal to or greater than a predetermined level and the other pilot pressure input condition that the parameter is less than the predetermined level, the switching control is performed based on the pilot pressure input conditions of the variable relief valve 36 if the parameter is equal to or greater than the predetermined level, while based on the pilot pressure input conditions of the flow rate switching valves 65 and 66 if the parameter is less than the predetermined level. It is therefore possible to perform switching control in consideration of the both pilot pressure input conditions.

It is noted that in the present invention, no matter what kind of hydraulic devices to be provided with a pilot pressure may be selected appropriately. The determination of whether or not to provide a priority for the switching control of a pilot pressure input to hydraulic devices and, if provided, which hydraulic devices to be prioritized may also be made arbitrarily in accordance with the characteristics and/or application of the working machine. For example, in the apparatus shown in the figures, the traveling motors 18L and 18R may be removed from pilot pressure input target so that the switching control shown in the flow chart in FIG. 4 is only performed.

Figure 5:
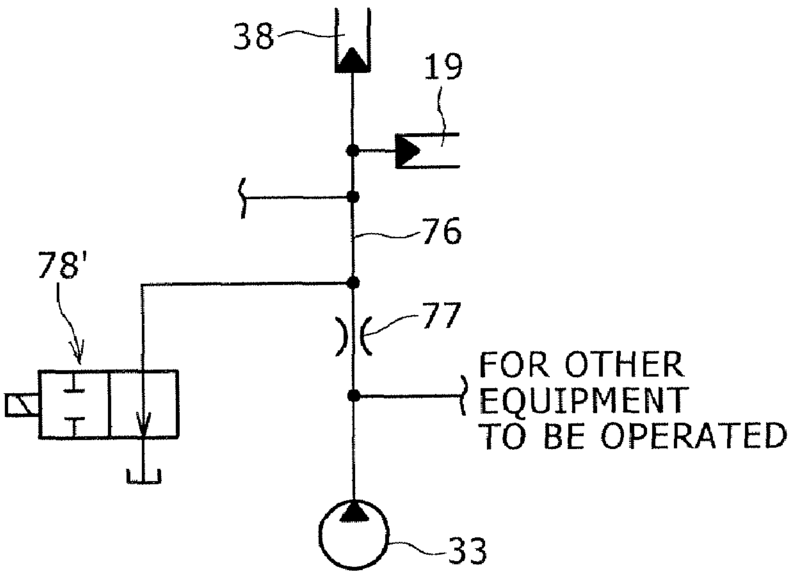
FIG. 5 is a circuit diagram showing an exemplary variation of the arrangement of a pilot pressure input switching valve in the hydraulic controller according to the present invention.

Further, the pilot pressure input switching valve according to the present invention may not necessarily be provided between the pilot hydraulic pump 33 and each pilot chamber. For example, a pilot pressure input switching valve 78' may be provided between the pilot line 76 and the tank as shown in FIG. 5, and the pilot pressure input switching valve 78' may be adapted to be opened to cause the pilot line 76 to communicate with the tank when there is no pilot pressure provided, while be adapted to be closed only when a pilot pressure is provided. In this case, if there is some other devices to be operated which are out of pilot pressure input switching control by the pilot pressure input switching valve 78', it is only required that a pressure holding throttle 77 be provided on the upstream side of the pilot pressure input switching valve 78' as shown in the figure, and that the other devices to be operated be connected to the line on the upstream side (higher-pressure side) of the throttle 77.

Although the invention has been described with reference to the preferred embodiments in the attached figures, it is noted that equivalents may be employed and substitutions made herein without departing from the scope of the invention as recited in the claims.

We claim:

1. A hydraulic controller for a working machine comprising:

- a pilot pressure input unit;
- a plurality of pilot-operated hydraulic devices adapted to be operated remotely by switching between a supply of an input signal of a pilot pressure and a stop of the supply to said pilot pressure input unit and provided with mutually different pilot pressure input conditions;
- a pilot hydraulic pressure source connected in common to each pilot pressure input unit of said pilot-operated hydraulic devices;
- a pilot pressure input switching valve provided in common for said pilot-operated hydraulic devices and adapted to be switchable between a pilot pressure input position where to input a pilot pressure from said pilot hydraulic pressure source to each pilot pressure input unit of said pilot-operated hydraulic devices and a pilot pressure relief position where to relieve said pilot pressure; and
- switching control means for controlling a switching of said pilot pressure input switching valve based on the operating state of said working machine and the pilot pressure input conditions of said respective pilot-operated hydraulic devices,
- wherein one of said pilot-operated hydraulic devices is given priority for pilot pressure input control as compared to at least another one of said pilot-operated hydraulic devices, and wherein said switching control means is adapted to control the switching of said pilot pressure input switching valve while giving preference to the pilot pressure input conditions of said one of said pilot-operated hydraulic devices based on said priority.

2. A hydraulic controller for a working machine comprising:

- a pilot pressure input unit;
- a plurality of pilot-operated hydraulic devices adapted to be operated remotely by switching between a supply of an input signal of a pilot pressure and a stop of the supply to said pilot pressure input unit and provided with mutually different pilot pressure input conditions;
- a pilot hydraulic pressure source connected in common to each pilot pressure input unit of said pilot-operated hydraulic devices;
- a pilot pressure input switching valve provided in common for said pilot-operated hydraulic devices and adapted to be switchable between a pilot pressure input position where to input a pilot pressure from said pilot hydraulic pressure source to each pilot pressure input unit of said pilot-operated hydraulic devices and a pilot pressure relief position where to relieve said pilot pressure; and switching control means for controlling a switching of said pilot pressure input switching valve based on the operating state of said working machine and the pilot pressure input conditions of said respective pilot-operated hydraulic devices, wherein said each pilot-operated hydraulic devices is provided with a priority for pilot pressure input control and said switching control means is adapted to control the switching of said pilot pressure input switching valve based on said priority, wherein if the operating state of said working machine meets the pilot pressure input condition of higher-priority pilot-operated hydraulic devices among said plurality of pilot-operated hydraulic devices having mutually different priorities, said switching control means is adapted to switch said pilot pressure input switching valve to said pilot pressure input position regardless of whether or not the operating state meets the pilot pressure input condition of lower-priority pilot-operated hydraulic devices, while if the operating state does not meet a specific pilot pressure input condition of higher-priority pilot-operated hydraulic devices, said switching control means is adapted to control the switching of said pilot pressure input switching valve based on the pilot pressure input condition of the lower-priority pilot-operated hydraulic devices.

3. A hydraulic controller for a working machine comprising:

a pilot pressure input unit;

a plurality of pilot-operated hydraulic devices adapted to be operated remotely by switching between a supply of an input signal of a pilot pressure and a stop of the supply to said pilot pressure input unit and provided with mutually different pilot pressure input conditions;

a pilot hydraulic pressure source connected in common to each pilot pressure input unit of said pilot-operated hydraulic devices;

a pilot pressure input switching valve provided in common for said pilot-operated hydraulic devices and adapted to be switchable between a pilot pressure input position where to input a pilot pressure from said pilot hydraulic pressure source to each pilot pressure input unit of said pilot-operated hydraulic devices and a pilot pressure relief position where to relieve said pilot pressure; and switching control means for controlling a switching of said pilot pressure input switching valve based on the operating state of said working machine and the pilot pressure input conditions of said respective pilot-operated hydraulic devices, wherein said each pilot-operated hydraulic devices is provided with a priority for pilot pressure input control and said switching control means is adapted to control the switching of said pilot pressure input switching valve based on said priority, wherein said pilot-operated hydraulic devices include a traveling motor having a capacity variable depending on the supply of the input signal of the pilot pressure, said traveling motor being provided with a priority higher than those of the other pilot-operated hydraulic devices, and wherein if said working machine is in a non-traveling state, said switching control means is adapted to control the switching of said pilot pressure input switching valve based on the pilot pressure input conditions of the other pilot-operated hydraulic devices.

4. A hydraulic controller for a working machine comprising:

a pilot pressure input unit;

a plurality of pilot-operated hydraulic devices adapted to be operated remotely by switching between a supply of an input signal of a pilot pressure and a stop of the supply to said pilot pressure input unit and provided with mutually different pilot pressure input conditions;

a pilot hydraulic pressure source connected in common to each pilot pressure input unit of said pilot-operated hydraulic devices;

a pilot pressure input switching valve provided in common for said pilot-operated hydraulic devices and adapted to be switchable between a pilot pressure input position where to input a pilot pressure from said pilot hydraulic pressure source to each pilot pressure input unit of said pilot-operated hydraulic devices and a pilot pressure relief position where to relieve said pilot pressure; and switching control means for controlling a switching of said pilot pressure input switching valve based on the operating state of said working machine and the pilot pressure input conditions of said respective pilot-operated hydraulic devices, wherein said pilot-operated hydraulic devices include first pilot-operated hydraulic device having a pilot pressure input condition that a specific parameter related to the operating state of said working machine is equal to or greater than a predetermined level and second pilot-operated hydraulic device having a pilot pressure input condition that said parameter is less than said predetermined level, and wherein in the case of employing the pilot pressure input condition of either said first pilot-operated hydraulic device or said second pilot-operated hydraulic device, said switching control means is adapted to control the switching of said pilot pressure input switching valve based on the pilot pressure input condition of said first pilot-operated hydraulic device if said parameter is equal to or greater than said predetermined level, while based on the pilot pressure input condition of said second pilot-operated hydraulic device if said parameter is less than said predetermined level.

5. The hydraulic controller for the working machine according to claim 4, wherein said first pilot-operated hydraulic device is a pilot-operation type relief valve adapted to be opened when the discharge pressure of a hydraulic pump exceeds a set pressure that increases with a pilot pressure input, while said second pilot-operated hydraulic device is an actuator flow rate switching valve for reducing the supply flow rate to a specific working hydraulic actuator with a pilot pressure input, and said parameter is the discharge pressure of said hydraulic pump.

6. The hydraulic controller for the working machine according to claim 5, wherein said second pilot-operated hydraulic device has at least one of the following pilot pressure input conditions:

a) a rotation driving speed of said hydraulic pump is equal to or less than a predetermined level; and b) a plurality of working hydraulic actuators including said specific working hydraulic actuator are driven simultaneously.

* * * * *